US011993421B2

(12) United States Patent
Hopkins et al.

(10) Patent No.: US 11,993,421 B2
(45) Date of Patent: May 28, 2024

(54) INFORMATION PRESERVATION AND CONVEYANCE SYSTEM AND METHOD OF USE

(71) Applicants: Dean Hopkins, Reno, NV (US); Dwight Allen, Greenfield, IN (US); Daniel Hopkins, Reno, NV (US); Nimesh Shukla, Reno, NV (US); Steven Malekos, Sparks, NV (US); Matthew Fisher, Reno, NV (US)

(72) Inventors: Dean Hopkins, Reno, NV (US); Dwight Allen, Greenfield, IN (US); Daniel Hopkins, Reno, NV (US); Nimesh Shukla, Reno, NV (US); Steven Malekos, Sparks, NV (US); Matthew Fisher, Reno, NV (US)

( * ) Notice: Subject to any disclaimer, the term of this patent is extended or adjusted under 35 U.S.C. 154(b) by 0 days.

(21) Appl. No.: 18/175,361

(22) Filed: Feb. 27, 2023

(65) Prior Publication Data

US 2024/0067405 A1 Feb. 29, 2024

Related U.S. Application Data

(63) Continuation-in-part of application No. 18/149,381, filed on Jan. 3, 2023, now abandoned.

(Continued)

(51) Int. Cl.

*G09F 27/00* (2006.01)
*B65D 25/54* (2006.01)

(52) U.S. Cl.

CPC .............. *B65D 25/54* (2013.01); *G09F 27/00* (2013.01)

(58) Field of Classification Search

CPC ................................ G09F 27/00; B65D 25/54

See application file for complete search history.

(56) References Cited

U.S. PATENT DOCUMENTS

| | | | | |
|---|---|---|---|---|
| 6,290,230 B1 * | 9/2001 | Anthony | A63F 9/00 273/447 |
| 2003/0150867 A1 * | 8/2003 | Wilson | B65D 23/0885 220/663 |

(Continued)

FOREIGN PATENT DOCUMENTS

| | | | |
|---|---|---|---|
| CN | 202645058 U | 1/2013 |
| KR | 101374222 B1 | 3/2014 |

OTHER PUBLICATIONS

Richard Gary; The world's knowledge is being buried in a salt mine; https://www.bbc.com/future/article/20161018-the-worlds-knowledge-is-being-buried-in-a-salt-mine; Oct. 18, 2016.

(Continued)

*Primary Examiner* — Gary C Hoge
(74) *Attorney, Agent, or Firm* — Holland & Hart LLP

(57) ABSTRACT

An information preservation and conveyance system for providing information and effects to intelligent creatures in the future. The system provides durable containers with components secured inside and durable structure components, such as building bricks for example, mountable to a durable building, pyramid, or other structure, with at least one structure component having external surface information readable by a human. Higher density durable information providing components may be secured inside a durable container by resilient devices to absorb impact forces. Durable optical magnifier pictographic instructions and an optical magnifier or projector may be secured by durable containers, which can have a container opener durably mounted to exposed sections on the durable containers. The durable containers can contain audio generation apparatus, which optionally may teach a language, and any of a wide variety of types of information and articles of possible interest and value to a discoverer in the future.

30 Claims, 18 Drawing Sheets

Related U.S. Application Data

(60) Provisional application No. 63/400,295, filed on Aug. 23, 2022.

(56) References Cited

U.S. PATENT DOCUMENTS

| | | | | |
|---|---|---|---|---|
| 2007/0115650 A1* | 5/2007 | Cohan | ..................... | G09F 27/00 362/276 |
| 2008/0091444 A1 | 4/2008 | Moore | | |
| 2013/0242417 A1* | 9/2013 | Melgren | .................. | B41D 1/00 359/802 |

OTHER PUBLICATIONS

Fleur Doidge; The Billion-Year Archive project: A post-apocalyptic disaster recovery plan; https://www.computerweekly.com/feature/The-Billion-Year-Archive-project-A-post-apocalyptic-disaster-recovery-plan; May 28, 2020.
5D Memory Crystal; https://www.5dmemorycrystal.com/.
5D Memory Crystal; https://www.5dmemorycrystal.com/faq/.
5D Memory Crystal; https://www.5dmemorycrystal.com/technology/.
Robin George Andrews; The Time Capsules That Will Outlast the Apocalypse; https://gizmodo.com/the-time-capsules-that-will-outlast-the-apocalypse-1830653288; Nov. 26, 2018.
Riichiro Inagaki; Voice Over Infinite Distance—Dr Stone; https://dr-stone.fandom.com/wiki/Episode_24; Jan. 3, 2020.
Chris Welch; Hitachi invents quartz glass storage capable of preserving data for millions of years; https://www.theverge.com/2012/9/27/3417918/hitachi-quartz-glass-data-preservation; Sep. 27, 2012.
International Search Report and Written Opinion of the ISA, dated Feb. 1, 2024, issued in corresponding PCT application No. PCT/US2023/030916.

* cited by examiner

| 1702 | 1704 | 1706 | 1708 / 1710 |
|---|---|---|---|
| b | b, bb | bug, bubble | |
| d | d, dd, ed | dad, add, milled | |
| f | f, ff, ph, gh, lf, ft | fat, cliff, phone, enough, half, often | |
| g | g, gg, gh, gu, gue | gun, egg, ghost, guest, prologue | |
| h | h, wh | hop, who | |
| d3 | j, ge, g, dge, di, gg | jam, wage, giraffe, edge, soldier, exaggerate | (etc.) |
| k | k, c, ch, lk, qu, q(u), ck, x | kit, cat, chris, accent, folk, bouquet, queen, rack, box | |
| l | l. ll | live, well | |
| m | m, mm, mb, mn, lm | man, summer, comb, column, palm | |
| n | n, nn, kn, gn, pn, mn | net, funny, know, gnat, pneumonic mneumonic | |
| p | p, pp | pin, dippy | |
| r | r, rr, wr, rh | run, carrot, wrench, rhyme | |
| s | s, ss, c, sc, ps, st, ce, se | pace, course | |
| t | t, tt, th, ed | tip, matter, thomas, ripped | |
| v | v, f, ph, ve | vine, of, stephen, five | |
| w | w, wh, u, o | wit, why, quick, choir | |
| z | z, zz, s, ss, x, ze, se | zed, buzz, his, scissors, xylophone, craze | |
| 3 | s, si, z | treasure, division, azure | |
| tʃ | ch, tch, tu, ti, te | chip, watch, future, action, righteous | |
| ʃ | sh, ce, s, ci, si, ch, sci, ti | sham, ocean, sure, special, pension, machine, conscience, station | |
| θ | th | thongs | |
| ð | th | leather | |

FIG. 17

INFORMATION PRESERVATION AND CONVEYANCE SYSTEM AND METHOD OF USE

CROSS-REFERENCE TO RELATED APPLICATIONS

This application is a continuation-in-part of, and incorporates by reference, the applicant's prior nonprovisional patent application, titled INFORMATION PRESERVATION AND CONVEYANCE SYSTEM AND METHOD OF USE, Ser. No. 18/149,381, filed Jan. 3, 2023; which claims priority through, and incorporates by reference, the applicant's prior provisional patent application, titled INFORMATION PRESERVATION AND CONVEYANCE SYSTEM AND METHOD OF USE, Ser. No. 63/400,295, filed Aug. 23, 2022.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

The technology of the present application relates to systems and methods for information preservation and conveyance of the preserved information to intelligent beings at a future time.

BRIEF SUMMARY OF SOME FEATURES OF THIS SPECIFICATION

The inventors have developed systems and methods for information preservation and conveyance of the preserved information to intelligent beings at a future time. Some embodiments preserve technological, cultural, and/or other information in a human comprehensible format, and in some embodiments, with redundancy to survive local disaster and/or deliberate attempts to destroy the information.

Some embodiments provide a path for individual archives to survive disasters, while remaining discoverable by low technology means, such as, for example, by dismantling a predetermined structure to salvage bricks, or by use of archeological exploration and recovery.

Some embodiments provide an enclosed reading tool, and in some embodiments, pictographic instructions to use the readers to view the enclosed or other data in a variety of ways and in a variety of formats.

Some embodiments have one or more durable containers, a first plurality of durable information providing components secured inside the one or more durable containers, high density, compressed optically viewable information in at least one of the durable containers, and an optical magnifier apparatus secured in a durable container. Some systems include one or more structure components mountable to a building, pyramid, or other man-made structure, each of the one or more structure components having an external structure surface with information readable by a human having vision sufficient to read a typical text. In some systems, the optically viewable information includes compressed optically viewable information.

In some embodiments, the first plurality of durable information providing components is secured in position inside the durable container by at least a first resilient device, such as for example a spring. Some systems include a durable optical magnifier pictographic instructions secured in a durable container.

Some applications include one or more durable containers having a container opener durably mounted to the exposed sections of the one or more durable containers.

In some embodiments, one or more of the durable containers are hermetically sealed. And some applications include an audio generation apparatus for conveyance of audio sound and/or information.

Some applications provide a combination of indicia marking on brick, optionally with durable hermetically sealed capsules with simple pictographic instructions on using a provided opener to easily access the contents, which can be stored in predetermined in brick structures. In some instances, the capsules contain a naked eye readable primer and magnifier or microscope for viewing higher data density.

In some instances, the system can provide the option of viewing the tiny images as large projected images, for example on an interior wall or other surface of a sufficiently darkened area or room with little more than sunlight as the source of light for the projector.

Some embodiments comprise the methods of use of the systems or their components identified above. Some embodiments provide a method of concealing, protecting, and revealing information.

In some embodiments, the information can be enclosed in a bland, innocuous structure. In some applications, this can conceal the contents from attack. Alternate embodiments can be in numerous pyramidal structures, some of which may be of modest height.

Some embodiments use a durable structural material, such as fired clay brick for example, having a long survival time, provide insulation and minimal seasonal temperature cycling, and be fire and heat resistant.

Some embodiments of durable structures of the present specification can be designed to likely become an object of compelling archeological interest. For example, tumbled walls and damaged structures are often subject to analysis and re-assembly. Durable bricks from such structures would likely be cleaned of old mortar prior to re assembly. At this point information, marking, or other predetermined articles can be revealed by the mortar removal.

In some embodiments, as the durable structure is disassembled, durable capsules can be uncovered, in some embodiments with a provided opener and/or graphical instructions for opening the capsule.

One or more durable capsules may contain archival microscopic or compressed texts and images and tools to view them.

There are many other novel features and advantages of the present technology. They will become apparent at this specification proceeds.

The scope of the invention, however, is not to be determined by whether given subject matter provides a feature or aspect because it is set forth in this Summary section. The scope of the invention is rather to be determined by the scope of the claims as issued.

DESCRIPTION OF THE DRAWINGS

The inventor's preferred and other embodiments are disclosed in association with the accompanying Figures, in which:

FIG. 17 is a plan view of glass plate with educational indicia and audio or sound generating structure, which in this case is audio or sound generating tracks or grooves;

FIG. 19 is an side elevational view of an audio track of FIG. 25;

DETAILED DESCRIPTION

Figure 1:
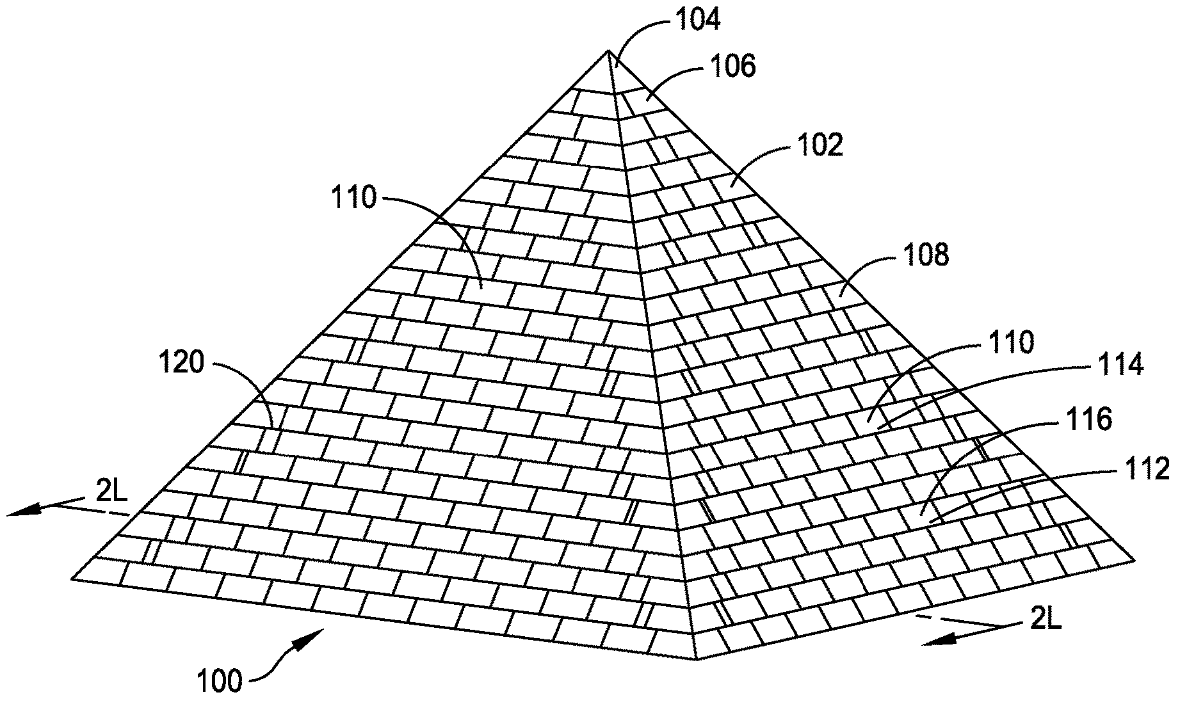
FIG. 1 is a perspective view of a pyramid structure for storage and conveying of information and possibly other components in a human comprehensible manner.

With reference now to FIG. 1, a pyramid-shaped structure, generally 100, provides one implementation of a durable structure to store and convey cultural, technical knowledge, and other information and content, in some embodiments through one or more global disasters across multi-millennia. The pyramid 100 consists of: fired clay bricks 102; a top corner brick 104 having a pyramid shape and sized to fit on the underlying top corner supporting bricks, e.g., 106; and side edge corner bricks, e.g., 108, that provide a sloped side edge to match the slopes of the pyramid side faces, e.g., 110, 112, provided by side bricks, e.g., 114, 116, that collectively provide planar pyramid sides, e.g., 110, 112, of the pyramid structure 100.

Such structures can include pyramids (as shown in this example), monument pedestals, buildings, walls, works of art, and other structures. The pyramid implementation 100 provides sloped sides, e.g., 110, 112, that shed water, snow, ash, and debris and direct them away from the pyramid 100. Lateral and other forces such as wind, flood, tsunami impacts, and blast waves and their driven debris are deflected away by the pyramid implementation 100 to prevent them from penetrating the pyramid 100.

Externals side bricks, e.g., 114, 116, can have informational indicia, such as instructions for locating other information within the pyramid or elsewhere, etched or cut into their upper and bottom sides that can become uncovered by archeological or other dismantling of the bricks from the pyramid 100. This arrangement and others disclosed herein for providing information only inside pyramid or other structure can protect and preserve the information from catastrophic and even routine environmental events while enhancing the likelihood of subsequent exploration of the structure and discovery the information and other information and artifacts, tools, etc., as desired.

As used herein, a "brick' is a block comprised of, and in some embodiments, consisting essentially of, fired or sun dried clay, or in some embodiments other durable material, used in building structures. In some embodiments, a brick is sized, and may have box-like outer periphery, so that an individual construction worker can handle the brick, apply any needed mortar, and place together with other bricks to form a structure. Sun-drying and firing of a clay brick can drive out any residual moisture and can heat it sufficiently to bond the constituent clay and sand particles into a solid mass that resists abrasion, weathering, and handling.

Thus, the durable bricks in a durable structure can provide concealment, protection, and, paradoxically, desired exposure. Concealment of many, up to thousands or more, of innocuous brick structures sprinkled among millions of ordinary every-day brick structures would not attract undue attention in times of war, cultural revolution, rioting, etc. Bricks can provide exceptionally durable yet discoverable protection. Fired clay bricks, for example, can preserve text for at least 4,500 years and can protect material located 5-10 millimeters below the brick surface from a nearby nuclear explosion.

Figure 2:
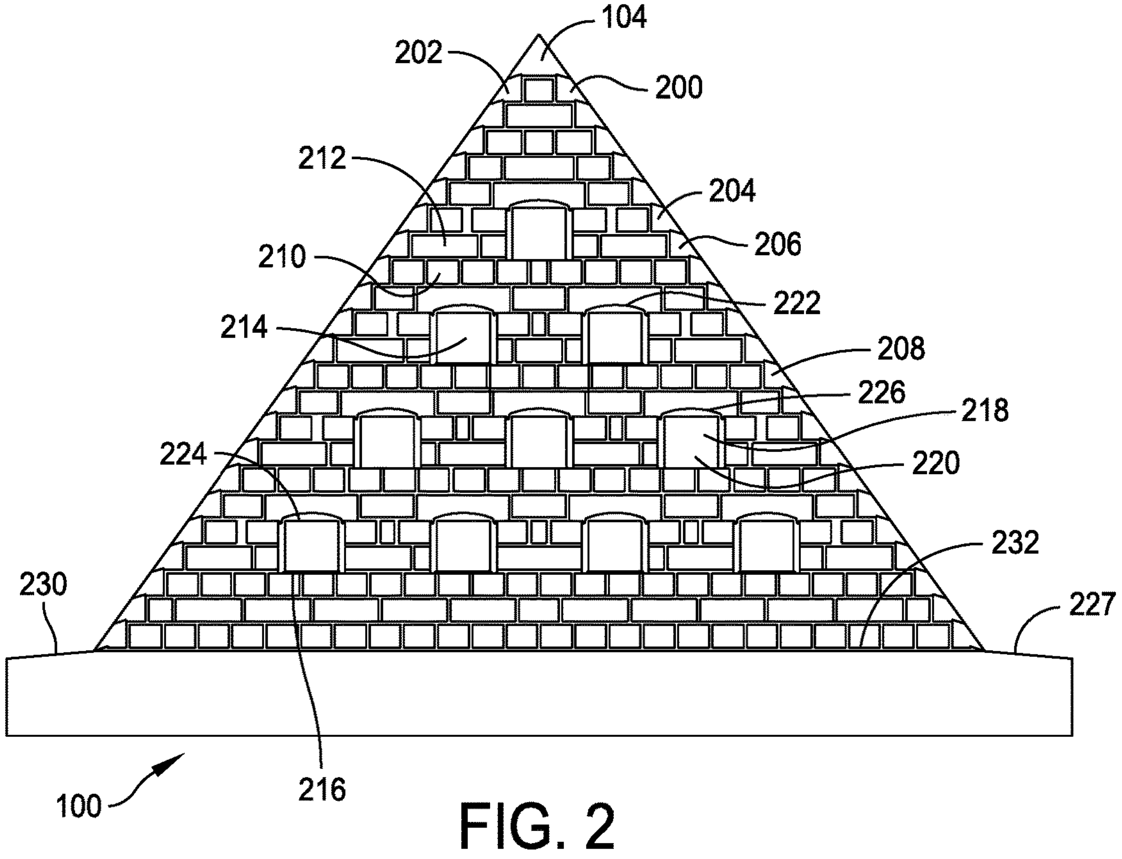
FIG. 2 is a cross-sectional view taken along section line 2L-2L of FIG. 1.

With reference now to FIG. 2, the top corner brick 104 rests on four sloped corner bricks, e.g., 200, 202, which in turn rest on: (i) sloped lower corner bricks, e.g., 204, 206, aligned one 206 over the other 204 to collectively form a corner 208 of the pyramid 104; and (ii) filler bricks, e.g., 210, 212, laser marked with text and graphics (not shown in FIG. 2). The filler bricks, e.g., 210, 212, form a substantially solid pyramid core that has hollow vaults, e.g., 214, 216, in select locations. At least some of the vaults, e.g., 218, can be sized to contain sealed archival time capsules, e.g., 220, yet also be small enough and spaced far enough apart so that the vaults, e.g., 214, 216, 218, do not substantially diminish the overall strength of the pyramid structure 104. The vaults, 214, 216, 218, are sealed and protected by arched vault covers, e.g., 222, 224, 226. The pyramid 104 is set on a robust, strong foundation 227, such as bedrock or concrete, and has exposed upper surfaces, e.g., 228, 230, extending at a downward angle away from the lower end 232 of pyramid structure 104 to direct water and other matter away from the pyramid structure at its lower end 232.

Figure 3:
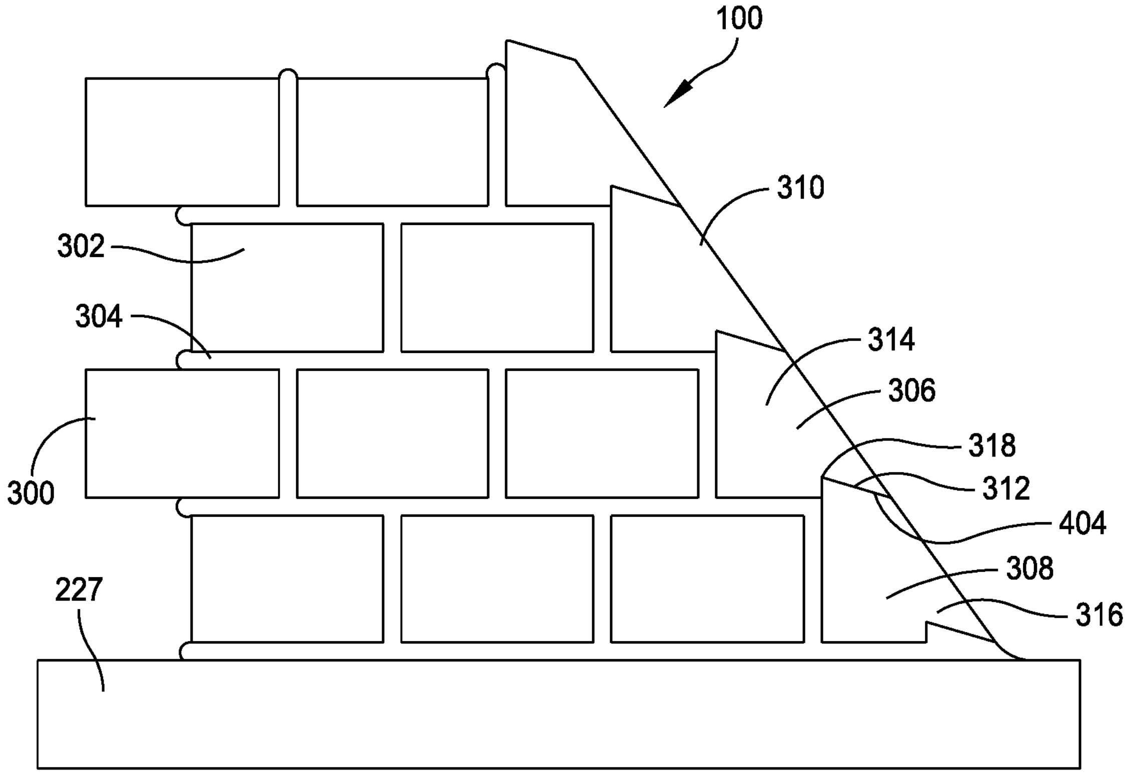
FIG. 3 is a partial portion of the cross-sectional view of FIG. 3 showing interlocking exterior bricks on the outer face of the pyramid structure.

Referring now to FIG. 3 the bricks, e.g., 300, 302, vaults (not shown in FIG. 3, and interior bricks and vaults (not shown in FIG. 3) in the pyramid 104 are mortared together, e.g., 304. The exterior bricks, e.g., 300, 302, exterior side corner bricks, e.g., 306, 308, mortar 304, and, in some embodiments, foundation 227 both shed water and wick fluid incursions out of the pyramid 104 to the outside of the pyramid structure 104. The resulting angled exterior 310 of the pyramid 104 can deflect high winds and wind born debris.

Both interior bricks (not shown in FIG. 3) and exterior bricks, e.g., 300, 302, 306, 308, can be marked, such as with a laser, to provide text and/or graphics as desired; and at least some of text can be sized to be readable by a human having vision in the range of from below 20/20 up to 20/100—for example with letters being approximately 2.5 mm (≈0.1") in character height.

The brick structure can include one or more of the following features:

- exterior bricks can be angled and faceted to index together to form a smooth direct brick to brick interlocking surface;
- laser marking of the interior bricks can be arranged to encourage careful disassembly by an intelligent being such as a human;
- interior brick laser marking can be hidden from view from the outside of the pyramid; and
- sealed archive time capsules can be hidden from view in brick niches and vaults scattered within the structure, such as, for example, a pyramid, a house, a public building, or any other assemblage, which can be designed to appear to be innocuous and/or not of the type containing hidden content.

Figure 4:
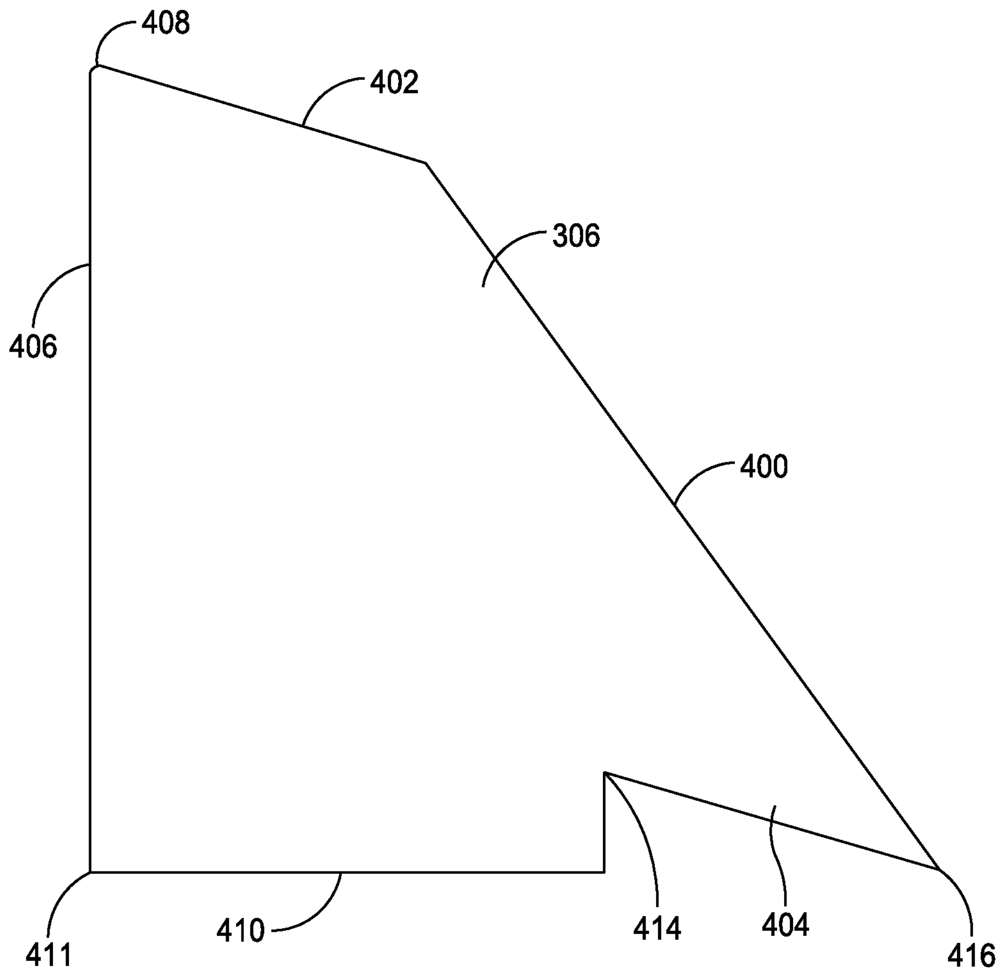
FIG. 4 is an side elevational view of an exterior brick of FIG. 3.

Referring now to FIG. 4, a side corner brick 306 has an outer downwardly sloped corner edge 400 extending between opposed downwardly sloped upper and lower planar stacking surfaces 402, 404. Laterally opposite the corner edge 400 are a vertically planar rear surface 406 extending from the upper end 408 of upper planar stacking surface 402 to a horizontal planar lower surface 410 transversely extending from the lower end 411 of the planar rear surface 406 to a stacking notch 414 penetrating the planar lower surface 410 and terminating in the lowermost end 416 of corner edge 400.

Figure 5:
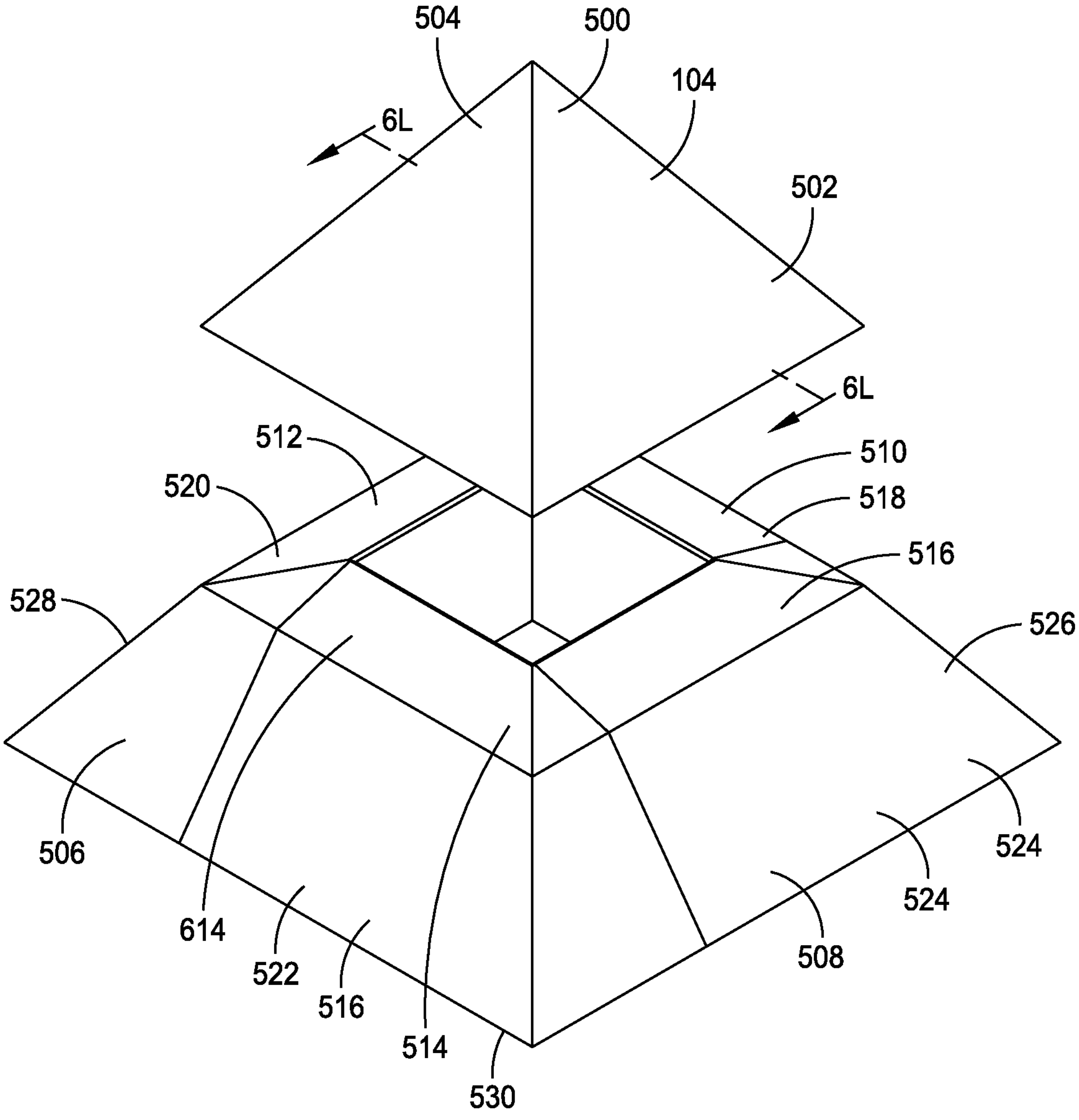
FIG. 5 is an exploded view of a chief cornerstone brick mountable to four underlying point support corner bricks.

With reference now to FIGS. 3 and 5, the side corner bricks 306, 308 can provide one or more of the following features:

- interlocking of opposed upper and lower surfaces 404, 312, respectively, in stacked side corner bricks 308, 306, respectively, preserving alignment between the upper and lower surfaces 404, 312, respectively, resulting in a smooth and strong transition from one corner brick, e.g., 306, to a matingly abutting corner brick, e.g., 308, and that sheds water downwardly and offers little purchase for seeds and debris;
- the exterior corner edges, e.g., 400, planar upper and lower ends, e.g., 312, 404, and sides, e.g., 314, 316, of the side corner bricks, e.g., 306, 308, are angled downward away for the core ((not shown in FIGS. 3 and 4) of the pyramid structure 104 to shed water intrusion to the outside of, and away from, the structure 104; and
- the upper interlocking point 318 where the upper planar end, e.g., 312, of a side corner brick, e.g., 308, abuts the mating lower end, e.g., 404, of an upper side corner brick, e.g., 306, causes the lower side corner brick, e.g., 308, to fully penetrate, and firmly and strongly interlock in the stacking notch 414 of the upper side corner brick, e.g., 306.

Referring now to FIG. 5, a pyramid top point brick 500 itself has a pyramid shape with four downwardly sloped triangular sides, e.g., 502, 504. The top point brick 500 mounts to a mating set of four pyramid point support bricks 506, 508, 510, 512 on their upper downwardly angled planar upper ends 514, 516, 518, 520, respectively. More steeply downwardly angled planar sides, e.g., 522, 524, 526, 528, respectively, on the support bricks, 506, 508, 510, 512 extend from the planar upper ends 514, 516, 518, 520, respectively, to the lower ends, e.g., 530, of the support bricks, e.g., 506.

Figure 6:
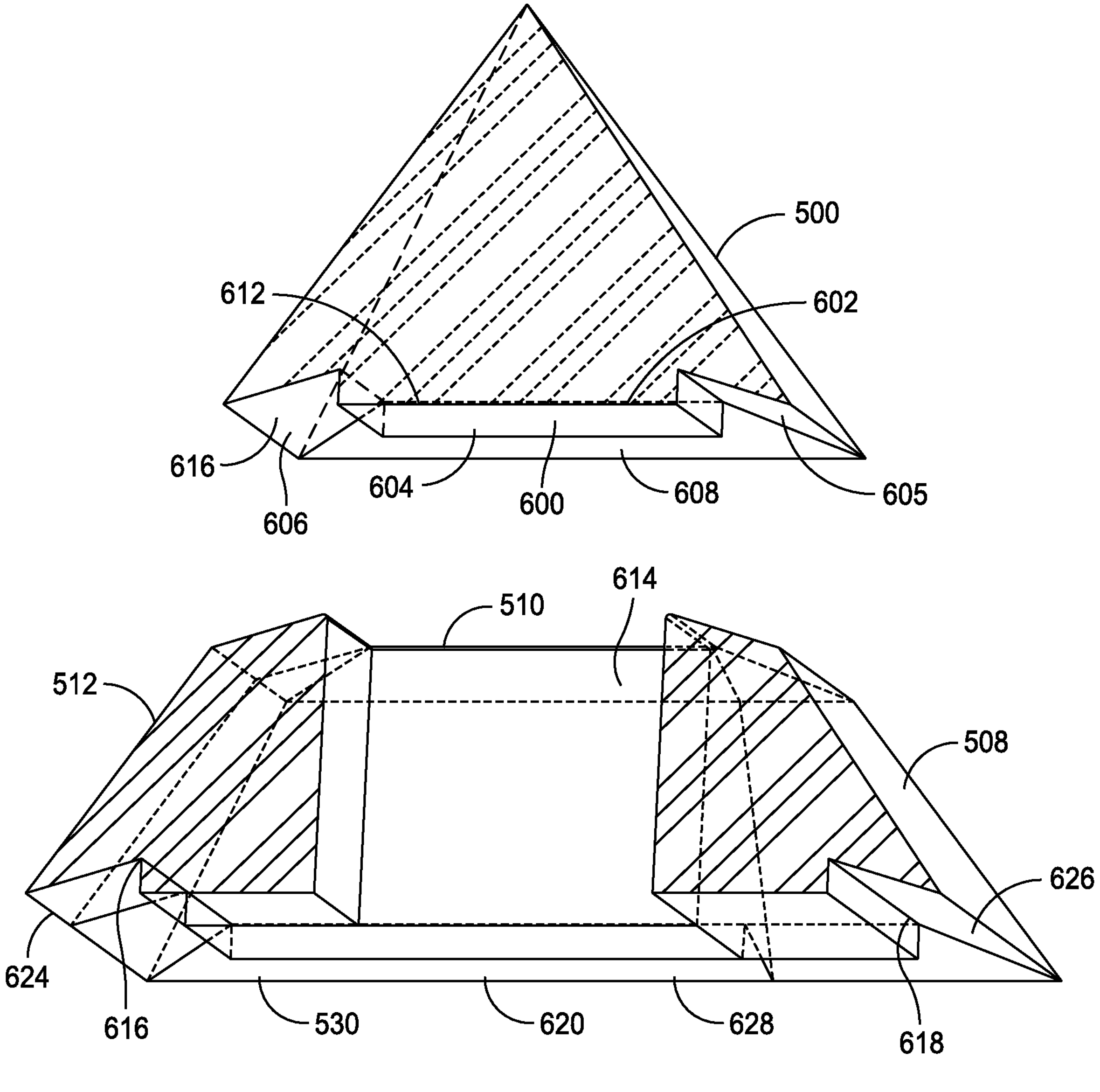
FIG. 6 is an exploded cross-section view, taken along section line 6L-6L in FIG. 5.

With reference now to FIG. 6, the bottom side 600 of top point brick 500 has a lower end 602 with a horizontal planar surface 604 extending between transversely aligned pairs of opposed mounting notch ends 605, 606, and 608. The horizontal planar surface 604 provides a downwardly extending rectangular boss 612 penetrating a mating rectangular socket 614 provided by the pyramid point support bricks, e.g., 508, 510, 512. The four lower ends, e.g., 530, of the support bricks 508, 510, 512, 506 (506 not shown in FIG. 6) cooperatively provide four stacking notches 616, 618, 620, 622 (622 not shown in FIG. 6) in the four lower outer stacking notch ends 624, 626, 628, 630 (630 not shown in FIG. 6) of the support bricks 512, 508, 510, 506 (506 not shown in FIG. 6), respectively.

Referring now to FIGS. 5 and 6, the boss 16 is truncated in depth to leave room within the confines of the rectangular socket 641 for an archival capsule, other content, or structural bricks.

With reference now to FIGS. 1, 3, 4, and 5, the stacking and mounting technique for the upper point brick 500 and its lower support bricks 506, 508, 510, 512 are the same as for the side corner bricks 306, 308 of FIGS. 3 and 4. These stacking and mounting techniques provide secure alignment between the top point brick 104, its support bricks, e.g, 506, and lower pyramid bricks on which the support bricks stack, resulting in a smooth transition between pyramid bricks generally that sheds water and offers little purchase for seeds and debris.

Figure 7:
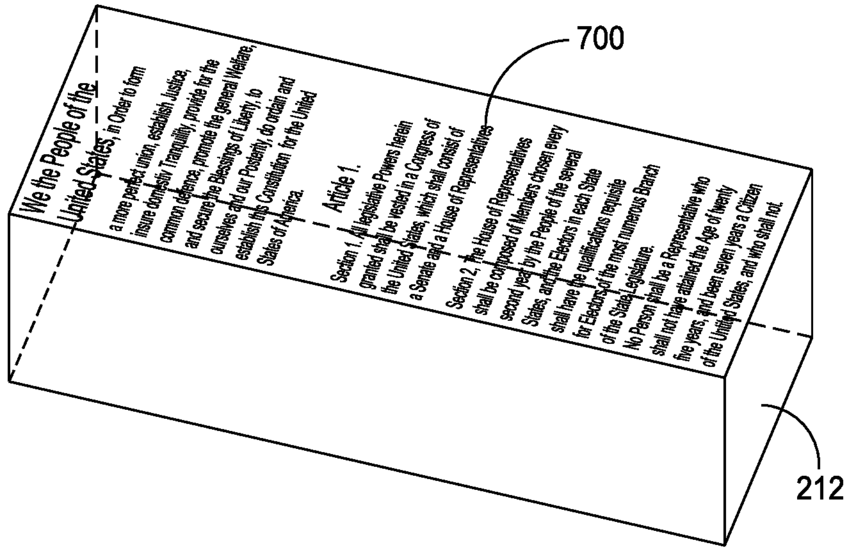
FIG. 7 is a perspective view of a conventional modular brick having text laser vitrified into its surface.

Turning now to FIG. 7, a structural brick 212, including bricks internally within the durable structure, can be of any desired form factor. As shown, the US modular size choice of the brick 212 is based on widespread availability within the United States, but any available brick may be substituted and, if needed, cut in the field. The brick 212 optionally has laser vitrified or other durable text 700, at least some of which can be sized to be readable by a human having vision in the range of from below 20/20 up to 20/100—for example with letters being approximately 2.5 mm (≈0.1") in character height.

Figure 8:
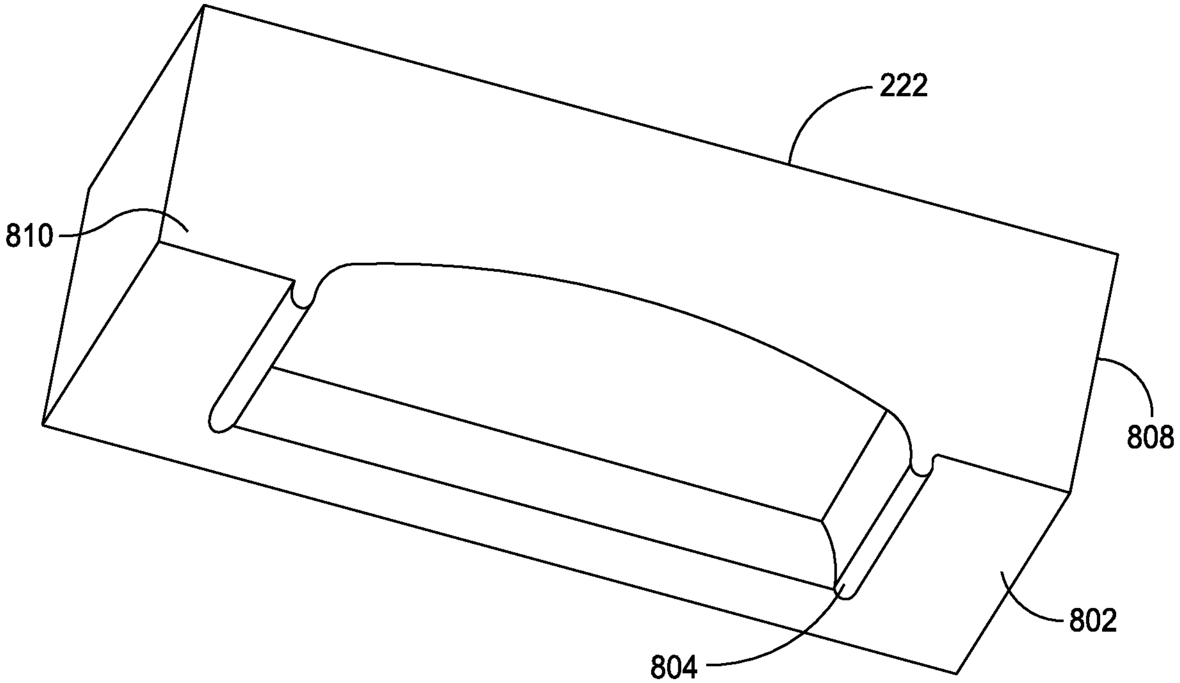
FIG. 8 is perspective cross-section showing half of an arched vault cover of the type shown in FIG. 2.
Figure 9:
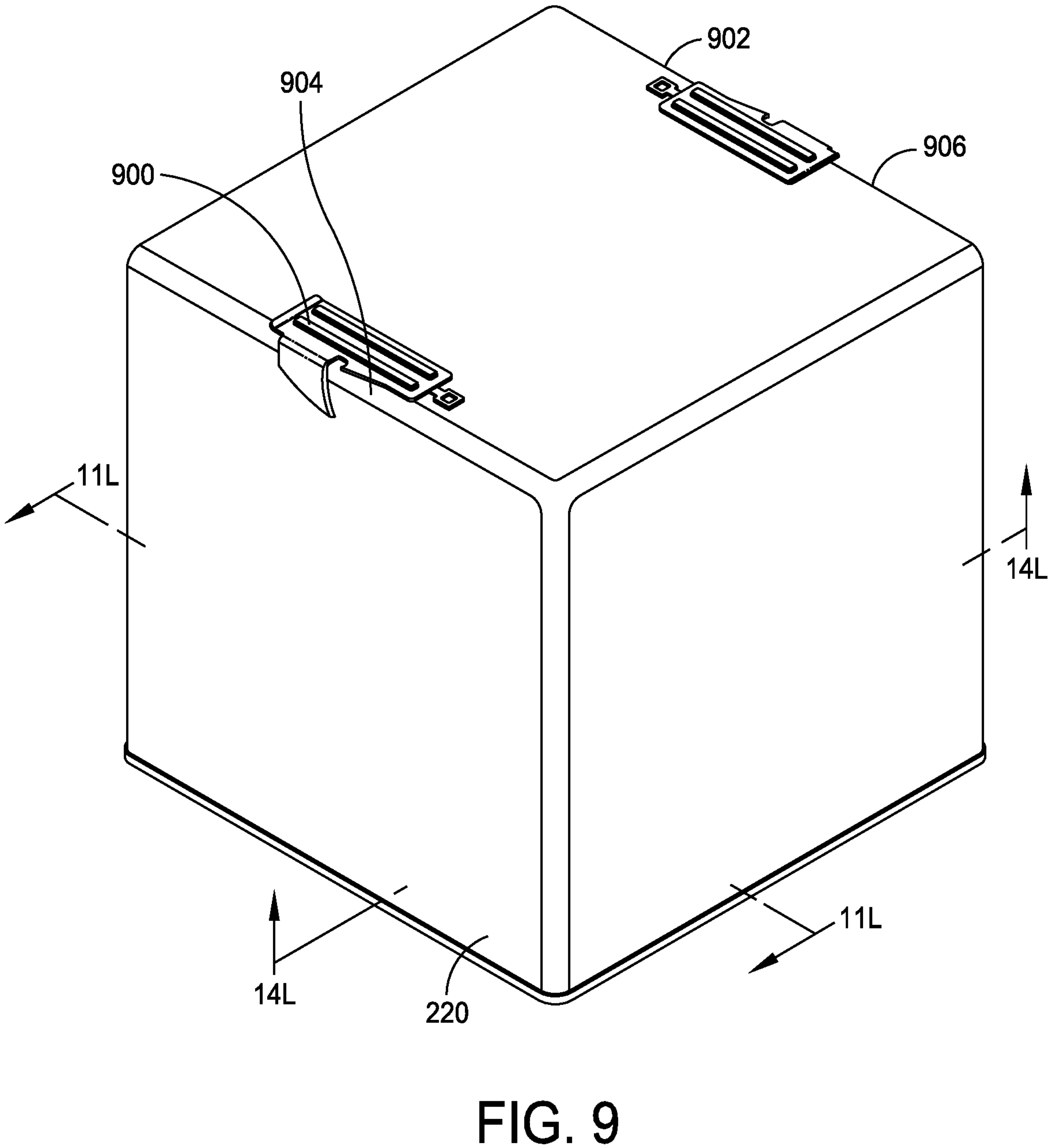
FIG. 9 is an isometric view of a sealed metal capsule with two attached can openers.

Referring to FIG. 8, an embodiment of an arched vault cover brick 222 can have a wide planar bottom mounting surface 802 with interior mount-locating ridge 804 extending below and from the plane of the mounting surface 802. The mount-locating ridge 804 also extends vertically downwardly from the vault brick's arched roof 806, which diverts downward forces on the cover brick 222 toward the cover brick's vertical side walls 808, 810 and mount-locating ridge 804. Referring now to FIG. 9, the cube time capsule 220 is made of a strong, long lasting material such as metal or a composite. In the depicted embodiment of FIG. 9, two novel, and each integrally-formed (such as by stamping from sheet metal), can openers 900, 902 are secured to two opposed upper side edges 904, 906 of the capsule 220 by, for example, spot welding of the can openers with a graphite paper buffer between the capsule 200 and openers 900, 902 in the non-welded areas.

Figure 10:
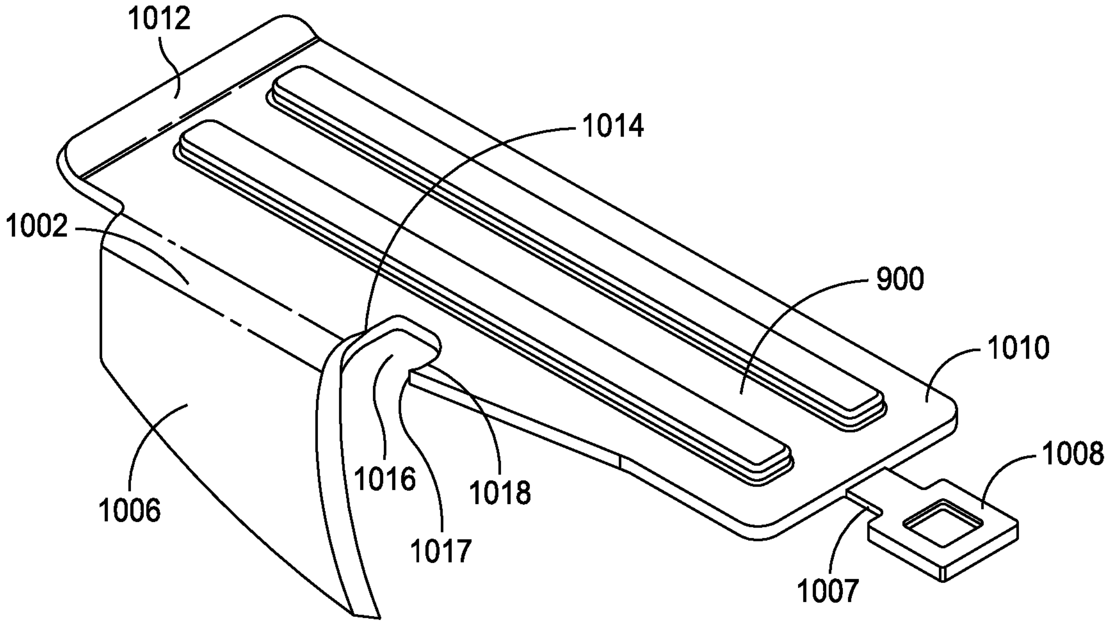
FIG. 10 is an isometric view of a can opener of FIG. 10.

Turning to FIG. 10, the can openers, e.g., 900, are modifications of the P-51 can opener. For example, the can opener 900, rather than being rotatably attached to a hinge as on a P-51 opener, has (i) an upper curved neck section 1002 extending, and curving downwardly, from the laterally extending opener handle 1004, (ii) a planar curved-edge-cutter 1006 extending downwardly from the neck section 1002. This rigid can opener 900 design substantially reduces the possibility of the can cutter 1000 becoming atom-to-atom welded to a hinge and having its cutter 1006 degraded or otherwise becoming stuck in the closed or collapsed position against the opener handle 1004. The can opener 900 also a widened square securing tab 1008 extending from a narrowed, notched neck section 1009, which in turn extends laterally from one end 1010 of the handle 1004 so that the securing tab 1008 can be secured to the capsule (not shown in FIG. 10) such as by spot welding of the securing tab 1008 to the top side of the capsule, while allowing for an anti-adhesion buffer composition, such as graphite for example, to be placed between the capsule and the can opener handle 1004, the upper curved neck section 1002, and cutter 1006.

The can opener 900 also has an upwardly curved end 1012 opposite the tabbed end 1010, providing a means for lifting the can opener 900 away from the capsule to break the narrowed, notched neck 1009, freeing the can opener 900 from being secured to the capsule, for use of the can opener 1009 to open the capsule or other containers. The curved end 1012 can also serve as a thumb stop 1012 when using the opener 900.

Figure 11:
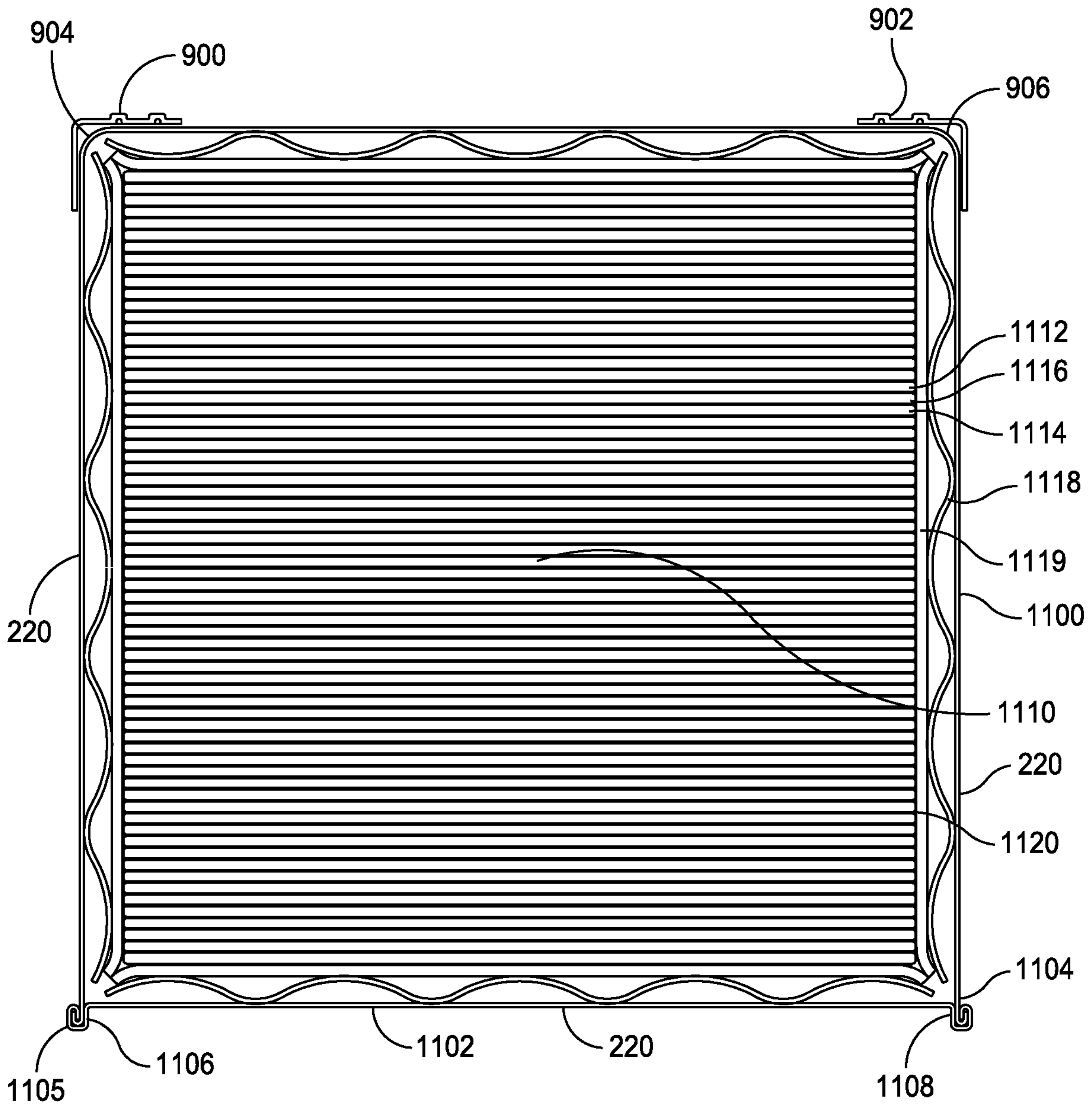
FIG. 11 is a cross-sectional view taken along section line 11L-11L in FIG. 10.

The fixed cutter blade 1006 also extends from one side 1014 of an opener fulcrum notch 1016 penetrating one edge 1017 of the opener handle 1004. The can opener's rim fulcrum hook 1018 is provided by the other side 1018 of the fulcrum notch 1016. Turning now to FIG. 11, the sealed metal capsule 220 has an inverted cup-shaped capsule body section 1100 sealingly abutting and secured to a lower generally planar bottom section 1102. This orientation of the body section 1100 over the bottom section 1102 helps seal contaminants, such as water, from penetrating the capsule 22.

The lower end 1104 of the capsule body section 1100 has a capsule seam closure 1105 penetrating a mating bottom section seam closure 1106 extending from the entire outer periphery section 1108 of the bottom section 1102. The interlocking seam closures 1105, 1106 are welded to seal the capsule 900. Can openers 900, 902 are welded to the opposed top edges 904, 906 of the capsule body section 1100. The curled interlocking seam closures 1105, 1106, provide a can opener ridge surrounding and extending from the lower end of the capsule body section 1100 in order to invert the capsule 220 and mount a can opener, e.g., 900, on the ridge and manipulate the opener 900 to easily pierce bottom section 1102 and move it by hand, in generally the same manner as an opened P-51 opener, to fully open the capsule 220 per pictorial instructions (not shown) on the outside surface of the capsule 220. In this regard, however, opener's curled end (1012 in FIG. 10) also provides a novel thumb-securing ridge for more securely performing the capsule opening operation.

The capsule 220 of FIG. 11 has a main contents section 1110 that can optionally include a wide variety of durable informational content and tools, such as for example, etched glass plates or disks, buffer sheets, reading tools, audio content and playback devices, component positioners, or other items of interest. In the depiction of FIG. 11, the contents section 1110 has informational glass plates, e.g., 1112, 1114, spaced apart by soft buffer plates, e.g., 1116; and contents section is resiliently secured by corrugated wave springs, e.g., 111, to absorb impact forces, abutting solid buffer plates, e.g., 1119, to spread any force evenly across the contents section 1110, and soft buffer sheets 34, to prevent abrasion, stiction, and chipping of the contents of the contents section 1110.

A capsule can therefore include one or more of the following features:

- a corrosion resistant can, such as when composed of stainless steel or titanium;
- metal components being made of the same metal eliminates the risk of galvanic corrosion;
- a double seam closure can be sealed by continuous seam welding, providing a hermetic seal while avoiding the need for any degradation-prone sealing compound;
- sealing in a dry, substantially inert atmosphere to avoid corrosion;
- a corrugated wave spring can cushion and isolate the contents from abrupt acceleration events and point impacts;
- buffer plates can spread out any point impact to reduce chipping, flaking and cracking of the glass plates.
- soft buffer sheets between each plate can reduce plate-to-plate crack propagation, plate-to-plate stiction, and abrasion of the metallic characters and images.
- can be entirely filled with durable informational components, or partially so filled with the remainder of the capsule volume dedicated to optical viewing, audio listening, positioning mechanisms, or other components, like artwork or other tools for example.

Figure 12:
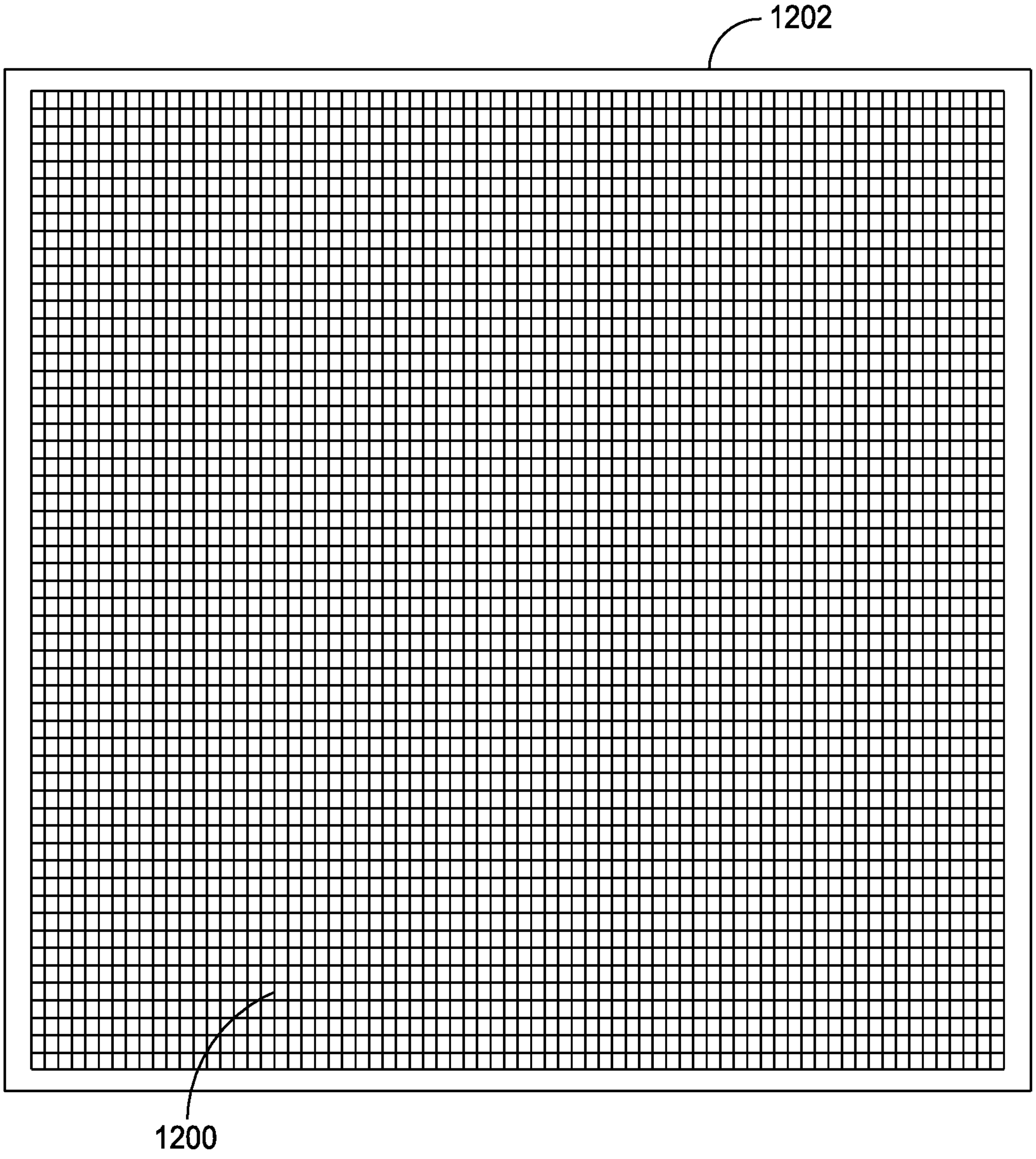
FIG. 12 is a plan view of a patterned photomask showing the text blocks of pseudopages.

With reference now to FIG. 12, a photomask blank, also referenced herein as a glass plate. can be etched or patterned by a commonly known photolithography technique. For handling and edge chip protection, the active photolithographed image area 1200 formed on the glass plate 1202 is confined to an area that is smaller than the full plate 39, by, for example, 3 mm. The image area 1200 can be contain a large number of 8½x11" pages compressed by conventional compression techniques to, for example, 0.078×0.101" (1.98×2.56 mm) pseudopages. Rounding the size to 2.0×2.5 mm can present layout advantages. In some embodiments, some of the plates will have a plurality of differing page sizes to provide some visible information and optionally providing from large to barely readable sizing, to inspire the finder to use magnification, and discover more compressed information occupying less space. Informational or other indicia or artwork can also be arranged on virtual pages that are key-stoned in concentric circular arrays, or in a single line of text spiraling in the area between the handling exclusion zone and the center of the disk if using a disk format is preferred over a substantially square plate in a given circumstance.

In addition, using conventional semiconductor fabrication technique, portions of glass plate or wafer can be cut into a small form factor, which can be s tacked and archived in a very compact package suitable for archeologically discoverable storage. Such techniques can also enable high-volume production of nano- or micro-scale or macro-scale images, resulting in affordable costs for storage of entire libraries of microminiaturized books.

Figure 13:
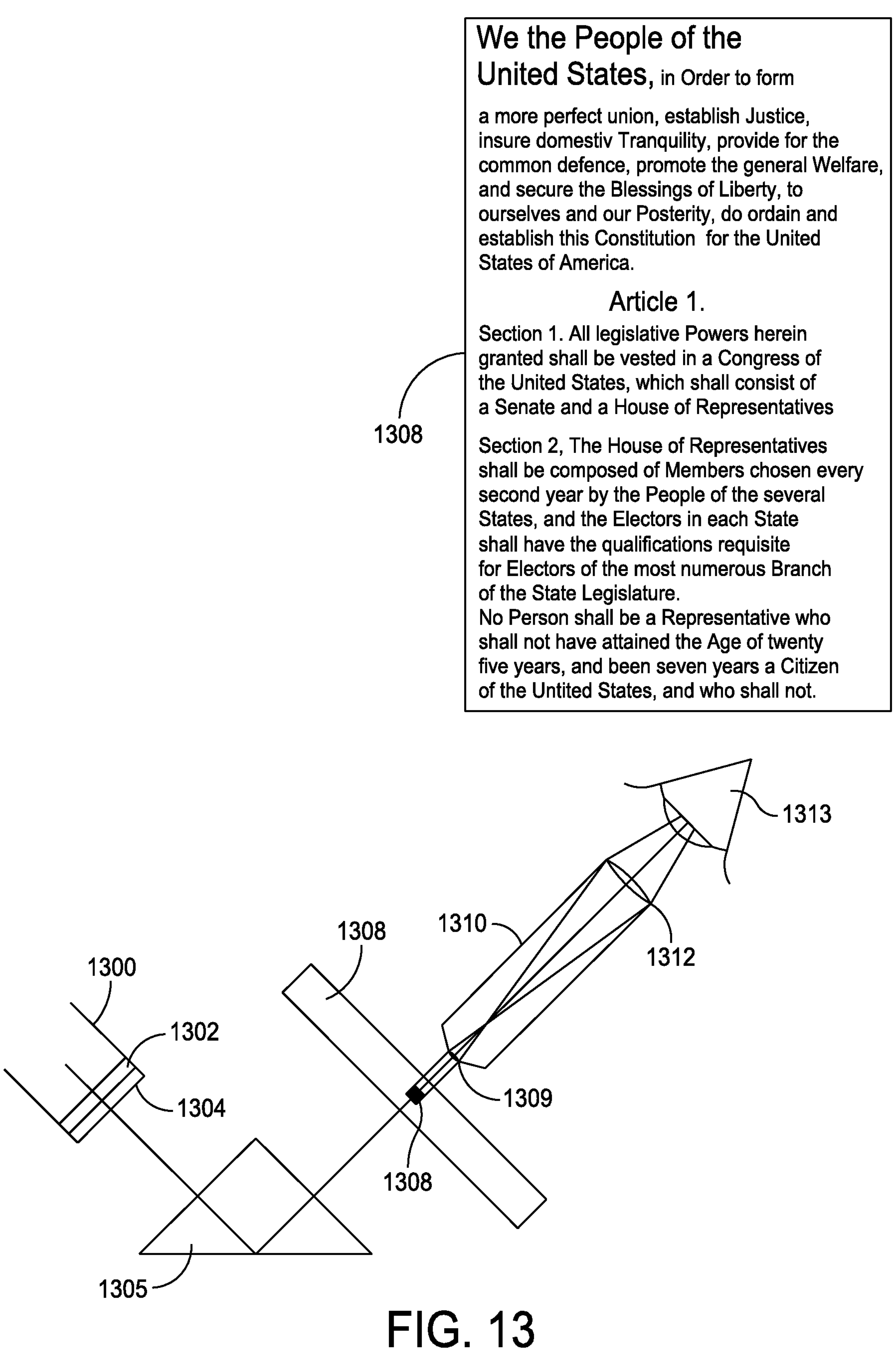
FIG. 13 is a schematic view of a single color microscope during use for a human eye to view compressed text.

With reference now to FIG. 13, a viewing tool or system that can be stored and conveyed in a durable capsule of other durable structure, can be a simple single color microscope observation system. Such a system can be provided by a light source 1300, such as raw sunlight, daylight sky or other suitable source of illumination, a heat blocking filter 1302, a yellow tinted glass, topaz, or yellow emerald color filter 1304, which provides a multiplicity of yellow wavelengths in the yellow (thus minimizing interference patterns and diffraction effects while substantially eliminating chromatic aberration); a turning prism 1305 or mirror to angle the yellow/filtered light into the microscope 1306, a glass plate 1307 with images 1308, an objective lens 1309 that gathers light from the text or monochromatic halftone image and admits it into the microscope 57, an eyepiece lens or lenses 1312 to focus and present the magnified image to an eye 1313 for perceiving the magnified image. The microscope system can be simplified by single color illumination and need only be concerned with proper fixed magnification, minimizing pin cushioning and reducing vignetting. Design can be further simplified by providing the ability to compensate for inverted images by simply flipping the original image plate.

The microscope system can provide one or more of the following features:

- components without organic coatings, adhesives or components that could outgas, become brittle, or crumble over thousands of years, such as 5,000 years for example;
- packaging as separate subassemblies, such as for example, parts that need to move with respect to each other in operation, such as focus and x-y scanning components. to prevent atom-to-atom welding over time;
- chromatic aberration elimination by using a single illumination color band, instead of achromatic lens sets with their multiple possible failure modes; and
- interference fringes management using multiple wavelengths within a color band.

Figure 14:
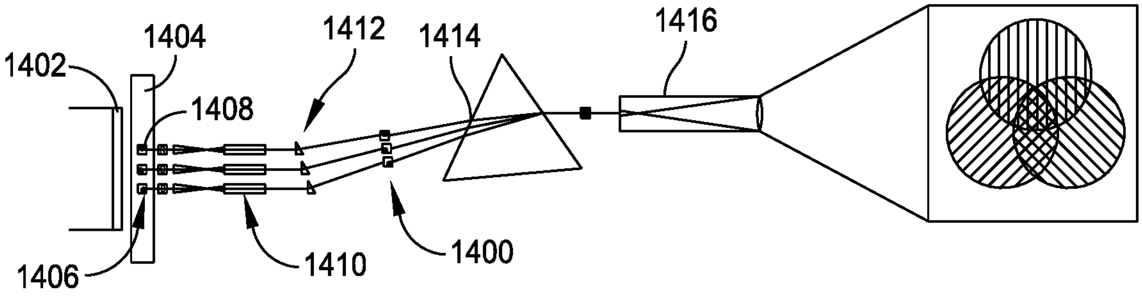
FIG. 14 is a schematic view of full color 3-D image projector in use.

Referring now to FIG. 14, another such viewing tool or system can be a full color/3-D image projection system. Such a system can be provided by: a the light source 1400, such as raw sunlight; a heat blocking filter 1402; a glass plate with images 1404; red, green, and blue tinted glass or other suitable material color filters 1406 that provide non-monochromatic light of the primary visual colors (thus minimizing interference patterns and diffraction effects of the resulting images 1408; objective lenses 1410 that gather and focus light from each color-separated halftone image and admit it into collimating optics that have their focuses and image sizes adjusted to correct for any chromatic aberration in the projection optics; turning (wedge) prisms 1412 to steer the resulting collimated image streams to a combining prism 1414 that combine the collimated images into a color converged and focused image that can then be magnified and projected to screen surface by low dispersion projection optics 1416, without losing focus or convergence. Keystone correction is achieved by the relative angles of the screen and projector.

With continuing reference to FIG. 14, by blocking the green filter, by, for example, making a opaque blank area on the glass plate corresponding the where the green portion of a full color image would be (with the resultant loss of ⅓ of the data density), or introducing an opaque blade anywhere in the optical path of the green portion of the image (with the resultant increase in the complexity and fragility of the reader), a bicolor red/blue "Anaglyph 3D" image forms on the screen. If the source images were taken from slightly different angles according to 3D image generation techniques know in the art, the projected image, when viewed through a red lens over one eye and a blue lens over the other, produces a three-dimensional viewing experience.

Figure 15:
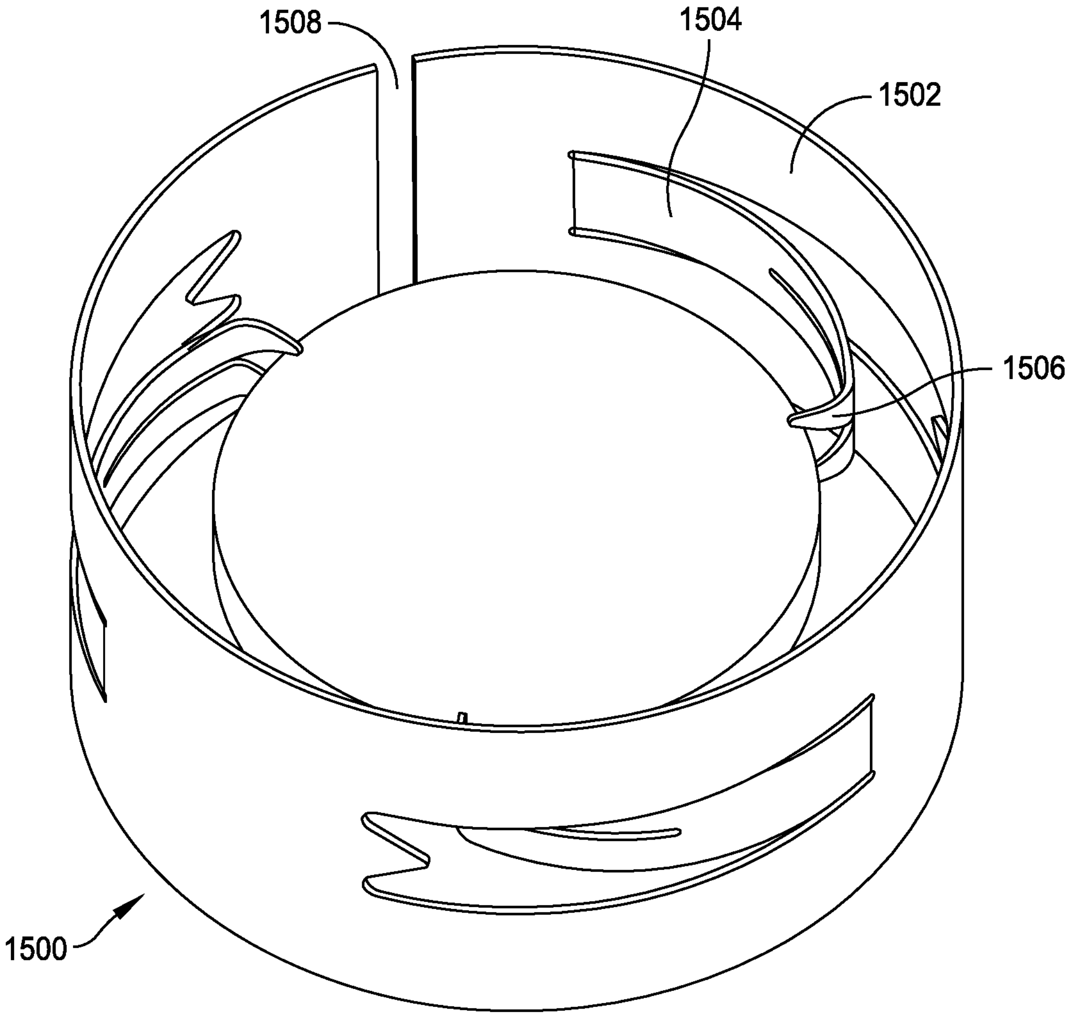
FIG. 15 is a perspective view if a resilient lens retaining and centering fixture.

The projection system may provide one or more of the following features:

- a system for combining three single color (red, green and blue) images using individual collimators and a color merging prism into a single full color fully registered colinear beam suitable for magnification and projection;
- a system in which the chromatic aberration of a single simple projection lens is compensated by offsetting the focus of the individual color collimators;
- a system where only the red and blue beams are displayed for a 3-D viewing experience using simple color filter viewing glasses;
- keystone compensation accomplished by adjusting the relative positions and angles of the projector and the viewing screen; and Referring now to FIG. 15, a lens retaining and centering fixture 1500 can be mounted in any many types of optical instruments (not shown) such as a microscope, telescope, projector, or other device. The fixture 1500 can be formed from a single portion of sheet metal to provide a resilient outer support ring 1502 with a plurality (three as shown in the FIG. 15 embodiment) inwardly bending, lens clamping and centering springs arms, e.g., 1504, extending radially inwardly from the outer support ring 1502. The innermost ends, e.g., 1506, of the springs arms, e.g., 1504 can have a split fork lens grasping shape or other shape suitable to grasp a given lens. In its free state, the resilient outer support ring 1602 has a predetermined mounting gap 1508 so that the resilient outer support ring 1602 can be compressed and thus placed and retained in position, by the resulting spring force urging the ring 1602 to decompress to the free state, in a surrounding tubular structure in the optical instrument in issue.

Figure 16:
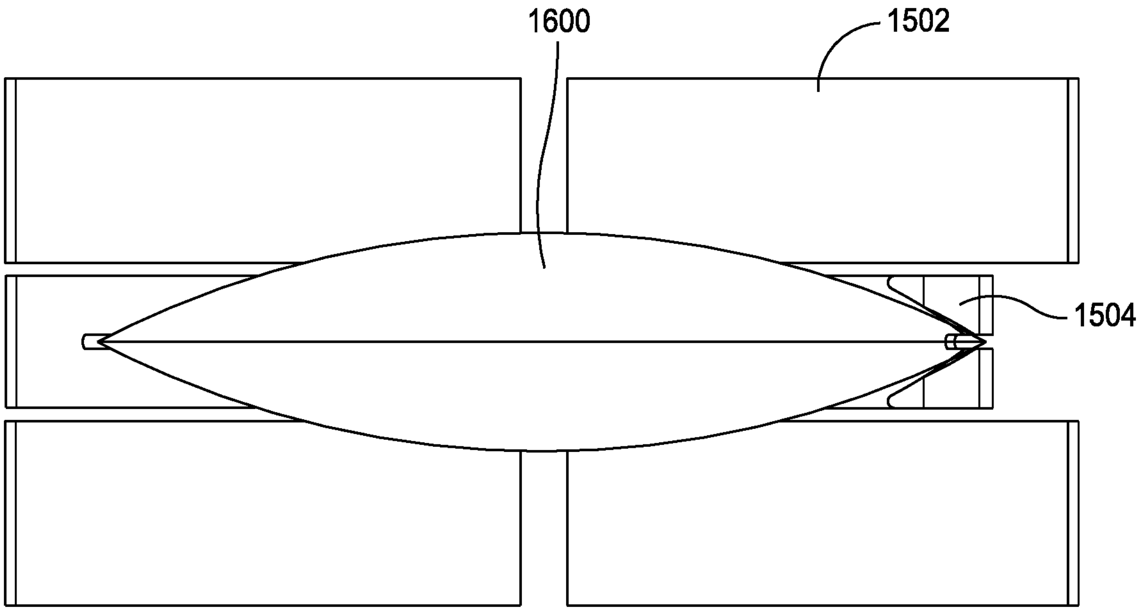
FIG. 16 is a cross-sectional view of the resilient lens retaining and centering fixture of FIG. 22 showing a lens mounted in the retaining ring.
Figure 18:
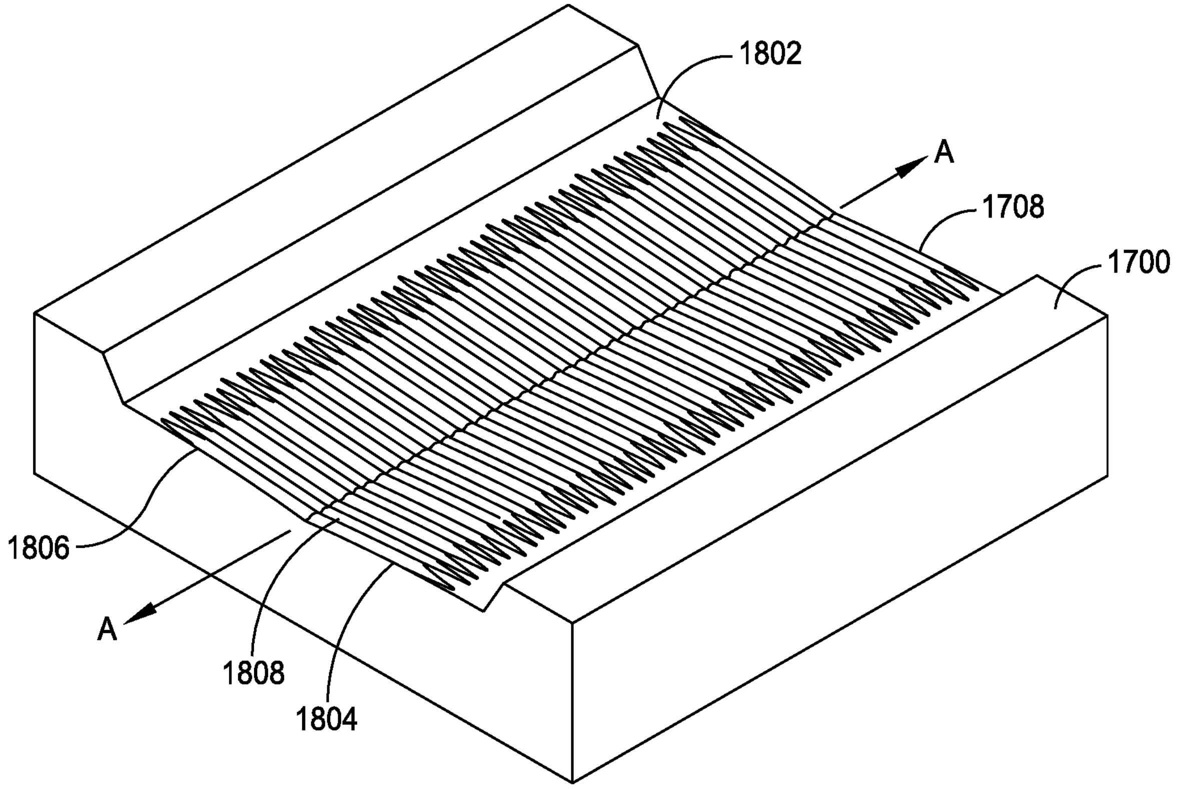
FIG. 18 is a partial isometric view of a small section of an audio track of FIG. 24.
Figure 19:
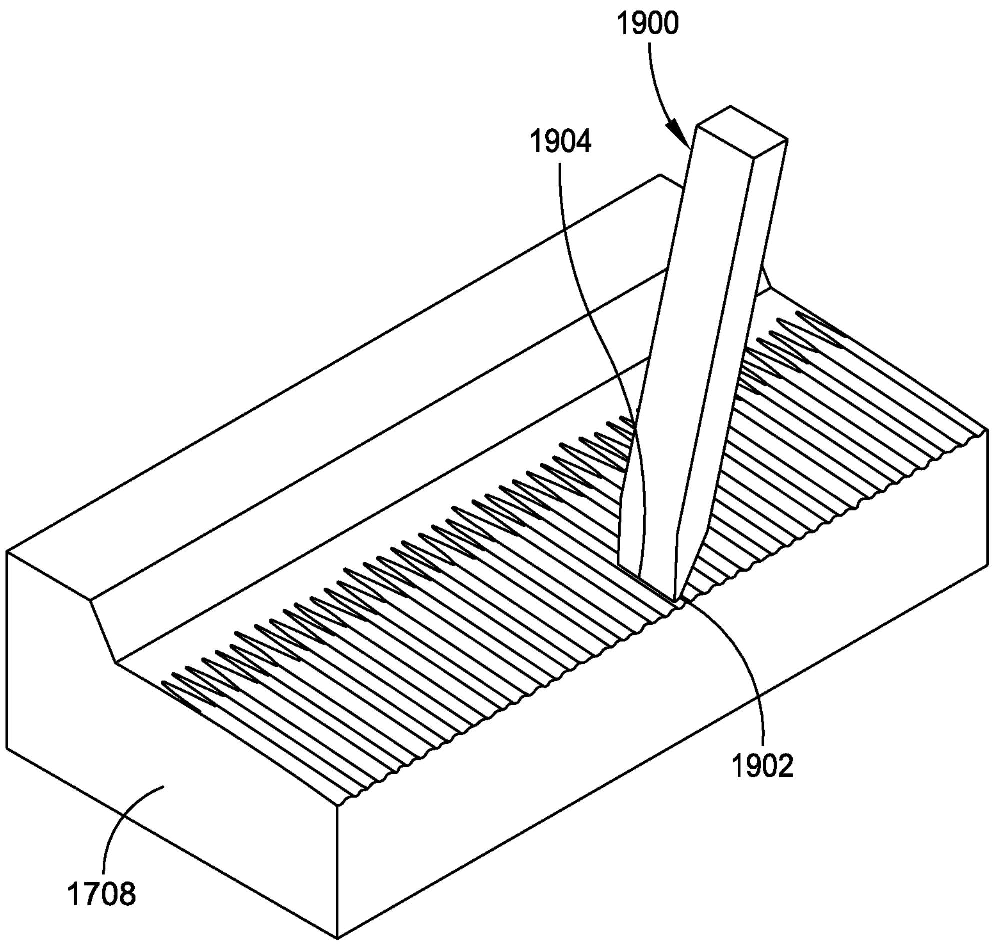
FIG. 19 is partial isometric view of strummer stylus of FIG. 27 being manually dragged along an audio track of FIG. 24.
Figure 20:
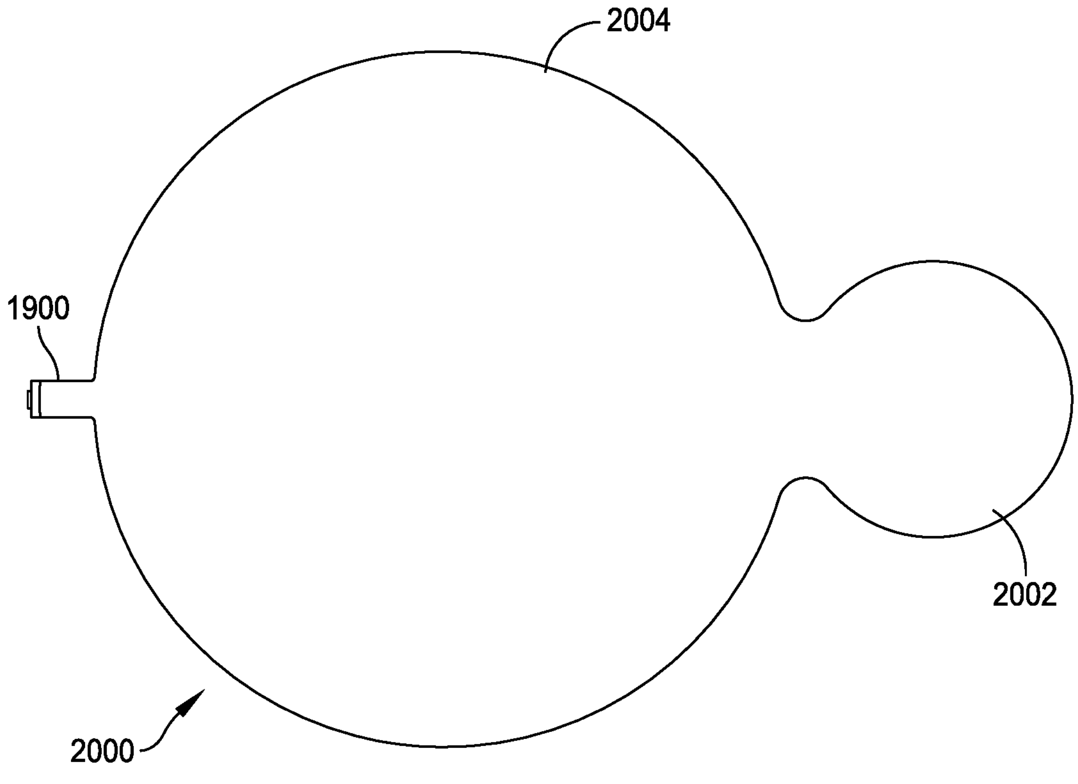
FIG. 20 is a plan view of a strummable audio generating pad with stylus.
Figure 21:
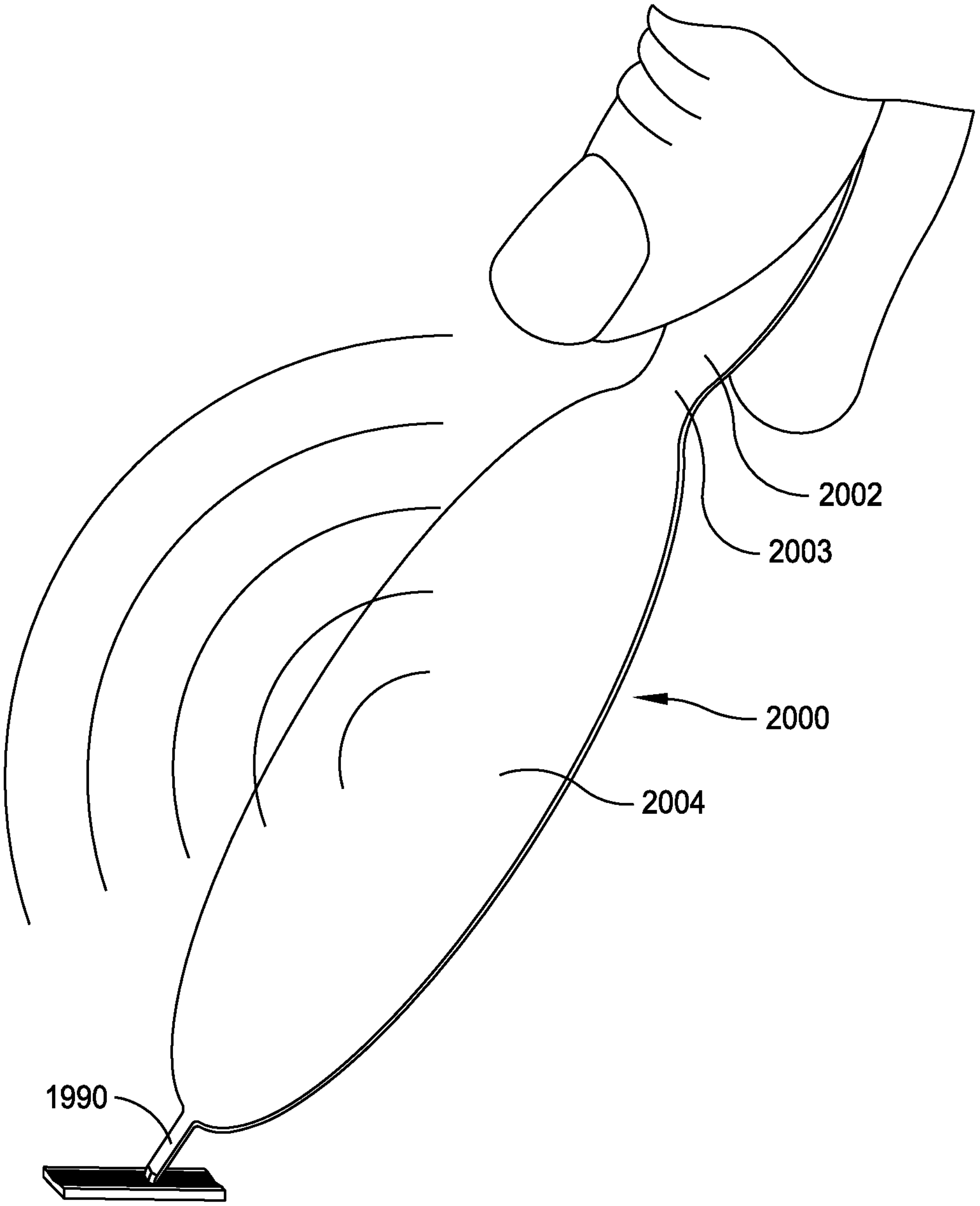
FIG. 21 is perspective view of manually strumming the audio generating pad of FIG. 20 within the audio track of FIG. 25 to generate audio.

Turning to FIG. 16, an exemplary lens 1600 can be retained within the outer support ring 1502 secured position within the spring arms, e.g., 1504. The spring arms 1504 thus center the lens 1600 in the optical path while providing substantial cushioning against mechanical shock, and thermal mismatch forces. An additional binding agent, such as sodium silicate binder, may be used to further attach, rather than merely grip, the lens to the spring arms, e.g., 1504.

The lens retaining and centering feature may include one or more of the following features:

- lens centering by spring arms that have sufficient flexibility to allow differential thermal expansion between the lens glass and the metal fixture while gently returning the lens(es) to the position in the event of impact.
- a lens holder designed to fit within fit within a groove of sufficient length, width, and depth to accommodate the outer ring of the lens holder in the tubular support structure—the "barrel" of the optical reader, be it a microscope, or telescope, or in the case of a multicolor projector the support structure, the "optical bench."

Now referring to FIG. 17, a durable language teaching system, in this case for teaching English, for inclusion in one or more durable capsules can include a glass plate 1700 with; IPA phoneme pronunciation symbols 1702; English letter graphemes 1704 corresponding to the respective phoneme sounds; examples of English words 1706 associated with each grapheme set 1706; and for each IPA symbol, an associated instruction or example sound reproducing tracks or grooves, e.g., 1708, 1710, formed in the glass plate 1700.

With reference to FIGS. 18-21, a sound reproducing recessed trench or groove 1708 has a generally U-shaped interior 1802 with a generally V-shaped bottom 1804 providing a series of parallel sound-yielding depressions or undulations, e.g, 1806, 1808, each extending transverse to the axis A-A of the groove 1708. A strummer stylus 1900 can be manually dragged over the undulations, e.g., 1902, to yield sound. The strummer stylus 1900 extends from a unitary resonating tool 2000 having a hand grip pad 2002 connected to a narrowed interconnecting neck 2003 extending from a resonator plate 2004 on the side of the plate 2004 opposite the strummer stylus 2000. The stylus 1900 is narrower than the width of the groove 1708 (transverse to groove axis A-A) to avoid dampening and spurious noise from the flat signal free sidewalls of the trench. By gripping the hand grip pad 2002 with a thumb and forefinger and dragging the stylus 1900 through the groove 1708, the rake angle allows the stylus 1900 to ride on the waveform provided by the undulations, e.g., 1902, and generate transverse vibrations on the resonator plate, which vibrations couple with air to yield audible sound.

The shape of the stylus end 1904 can mate with the undulation's shape 1902 to aid in centering of the stylus 1900 in the groove, e.g., 1708, and riding as desired in the undulations, e.g., 1902. The pull handle hand grip pad 2002 allows a firm grip when strumming the undulations while keeping the finger and thumb from dampening the vibrations on the relatively larger resonator pad 2004. Since the thumb and finger are not rigid their dampening effect is reduced by the narrow neck between the hand grip tab 90 and the resonator pad 89.

Referring now to FIGS. 17-21, a few such glass plates 1700, for example two, can identify, teach, and provide the sound of all 44 English language phonemes. Features that can be included include:

- the trenches can be deep enough to protect the undulations from surface scratches, and to guide the strummer down the track;
- the grooves and undulations may be formed by any of several means, such as gray scale lithography, ultrasonic machining, hot stamping, molding, laser ablation, or other suitable means; and
- the bottom of the trench can be flat, a Vee, an arc or any conic section or approximate conic section in recesses that may be a trench with straight sides that are vertical to 60° from vertical.

Other Options/Features:

The durable bricks can be placed in a variety of structures, ranging from standalone or other walls to houses, office and government buildings, and pedestals for monuments. Generally, such structures have vertical surfaces, but in some implementations, they can have sloped sides to better shed water, endure high winds and floodwaters, and deflect impacts, The inner portions of a durable brick can include sealed, corrosion-resistant capsules, such as cans in some embodiments, optionally with capsule openers and a graphic showing how to open the capsules. The capsule may have a system of springs and cushions to protect the inner contents. Inner contents may include one or more glass plates with imprinted text and or images, such as opaque and metallic text or images. The text and/or images may commence with or otherwise include, naked-eye-visible images of, in some embodiments, graphics and text, thereafter progressing to, or otherwise including, microscopic images.

Some systems can therefore provide one or more among the following:

- Bricks, or similar structures, can provide protection for the message. Fired clays, for example, have preserved cuneiform text for about 5,000 years.
- Laser marking can both contain a message, and provide a part of the message, since fine detail text and images precisely melted into a brick can provide information about the level of sophistication of the entities that developed this type of messaging.
- The text can include a book or compelling story, optionally starting at the top of the structure. This can cause a discovering entity to want to carefully disassemble the structure brick by brick, or similar structure, to find out how the story proceeds and ends.
- Disassembly by a discovering entity can reveal a multiplicity of time capsules imbedded in the bulk of the structure.
- Differing time capsules can have uniquely differing type or set of contents.
- The system can include a mix of capsule types, optionally with several capsules near the top of the structure, optionally with extra tools such as microscopes for example and further optionally with the individual plates containing primers, texts in multiple languages and formats (optionally images in full color, red-blue 3-D, full stereoscope).
- Archival packaging designed to survive for a very long time, such as, for example, 5,000 years
- Durable packaging and contents can be free of organic adhesives and coatings that could shrink, crack, yellow, outgas, and/or debond.
- A system for combining related images in a confocal and collinear fashion can enable simple viewing optics without convergence or chromatic aberration issues.
- Single color illumination of text and other images can allow simple microscope design without chromatic aberration, such as, for example, where true color viewing is unnecessary,
- Assembly of optics using glass frit, sodium silicate, 'wringing,' anodic bonding, and/or spring loaded fixtures can avoid use of outgassing materials.
- Internal surfaces of the optics can, if desired, have no paint or organic blackening, but optionally can be blackened with manganese or iron phosphating, or other non-outgassing darkening or blackening agent. The usual light oil coating can be omitted and unnecessary when the parts are optionally stored in an oxygen free environment.
- The internal surfaces of microscopes and projectors can be micro textured or sculpted to further reduce reflections.
- The durable medium is part of the message since obviously complex, stainless steel, or titanium, structures, tools, and indicia can lead a discovering entity to contemplate the meaning and value of the discovered subject matter.
- The durable structures and packaging can provide samples of articles and extra materials to analyze and duplicate them.
- Included telescopes can provide further information and tools for the discoverer.
- Included primers and 'Rosetta stones' can give the ability to translate these ancient texts into the current language.
- Included historical and current texts, drawings, and images can provide a vivid picture of current day-to-day life, the origins of our civilization, lessons from our experiences, etc.
- Included technology texts, patents and handbooks can help discoverers jumpstart or more of, for example, public health, civil engineering, machinery, metallurgy, chemistry, medicine, electronics, and more.
- Included holographic images.
- Included pointers to one-of and rare high density archives, such as Lunar Library, and Silica. This system can, in some embodiments, provide a bridge between iron age/renaissance levels and a supercomputer-enabled spacefaring civilization.

Included maps to, for example, Microsoft Silica, Arch Mission Foundation, and The Long Now Foundation archive sites.

Included 'vanity' images and many other types of data could be included, such as family histories, journals, names of contributors, personal messages to descendants, works of fiction, musical scores.

Transmission of cultural and technical data over hundreds of generations, and in some embodiments to people or other intelligent beings who are not already a high tech or space-faring civilization;

Directly human readable micro-text and/or graphics on durable material, for multi-millennia data transmission to technologically unsophisticated peoples, to facilitate, for example, rapid knowledge transfer and/or civilization building In a civilization where there are requirements for zero outgassing over millennia, embodiments of disclosed systems can meet those requirements, while also being capable of enduring impact Where achromatic stacks are required, avoiding organic adhesives by anodic bonding, as may be provided, for example, in the MEMS industry for bonding borosilicate glass to silicon.

Structural Alternatives:

Brick structure could be replaced with or include concrete or other durable structures.

Bricks could be replaced or combined with a metal structure

Glass plates could be replaced by metal or other types of durable plates, such as ceramic plates.

A sealed container could be replaced by thick impermeable coating(s) surrounding an article.

Marked bricks could be replaced with marked concrete blocks or hewn stone.

Stainless steel or titanium components can be replaced with other strong, corrosion resistant metal, metal alloy, ceramics, or composites.

Clear fused quartz in a glass plate can be replaces with other glass, preferably of a type providing high temperature tolerance and resistant to environmental etching.

Some or all brickwork could be eliminated, and the capsules can be stored in other structures such as building cornerstones.

What is claimed is:

1. An information preservation and conveyance system comprising:

A. a hermetically sealed durable container;

B. a first plurality of durable information providing components secured inside the durable container, with at least one among the first plurality of durable information providing components comprising first compressed optically viewable information;

C. an optical magnifier apparatus secured in the or another durable container.

2. The information preservation system of claim 1 further comprising a one or more structure components mountable to a building, pyramid, or other man-made structure, each of the one or more structure components having an external structure surface with durable information in the external structure surface.

3. The information preservation and conveyance system of claim 2 wherein a second durable information providing component includes second compressed optically viewable information.

4. The information preservation and conveyance system of claim 1 wherein the first plurality of durable information providing components is secured in position inside the durable container by at least a first resilient device.

5. The information preservation and conveyance system of claim 2 wherein the first plurality of durable information providing components is secured in position inside the durable container by at least a first resilient device.

6. The information preservation and conveyance system of claim 3 wherein the first plurality of durable information providing components is secured in position inside the durable container by at least a first resilient device.

7. The information preservation and conveyance system of claim 1 further comprising durable optical magnifier pictographic instructions secured in the or another durable container.

8. The information preservation and conveyance system of claim 2 further comprising durable optical magnifier pictographic instructions in the or another durable container.

9. The information preservation and conveyance system of claim 3 further comprising durable optical magnifier pictographic instructions in the or another durable container.

10. The information preservation and conveyance system of claim 4 further comprising durable optical magnifier pictographic instructions in the or another durable container.

11. The information preservation and conveyance system of claim 7 further comprising durable optical magnifier pictographic instructions in the or another durable container.

12. The information preservation and conveyance system of claim 6 further comprising durable optical magnifier pictographic instructions in the or another durable container.

13. The information preservation and conveyance system of claim 1 wherein the or another durable container has an exposed section with a durable container opener durably mounted to the exposed section.

14. The information preservation and conveyance system of claim 2 wherein the or another durable container has an exposed section with a durable container opener durably mounted to the exposed section.

15. The information preservation and conveyance system of claim 3 wherein the or another durable container has an exposed section with a durable container opener durably mounted to the exposed section.

16. The information preservation and conveyance system of claim 4 wherein the or another durable container has an exposed section with a durable container opener durably mounted to the exposed section.

17. The information preservation and conveyance system of claim 7 wherein the or another durable container has an exposed section with a durable container opener durably mounted to the exposed section.

18. The information preservation and conveyance system of claim 12 wherein the or another durable container has an exposed section with a durable container opener durably mounted to the exposed section.

19. The information preservation and conveyance system of claim 8 wherein the or another durable container has an exposed section with a durable container opener durably mounted to the exposed section.

20. The information preservation and conveyance system of claim 9 wherein the or another durable container has an exposed section with a durable container opener durably mounted to the exposed section.

21. The information preservation and conveyance system of claim 10 wherein the or another durable container has an exposed section with a durable container opener durably mounted to the exposed section.

22. The information preservation and conveyance system of claim 11 wherein the or another durable container has an exposed section with a durable container opener durably mounted to the exposed section.

23. The information preservation and conveyance system of claim 5 also comprising an audio generation apparatus.

24. The information preservation and conveyance system of claim 1 also comprising an audio generation apparatus also comprising an audio generation apparatus.

25. The information preservation and conveyance system of claim 2 also comprising an audio generation apparatus.

26. The information preservation and conveyance system of claim 4 also comprising an audio generation apparatus.

27. The information preservation and conveyance system of claim 7 also comprising an audio generation apparatus.

28. The information preservation and conveyance system of claim 12 also comprising an audio generation apparatus.

29. The information preservation and conveyance system of claim 18 also comprising an audio generation apparatus.

30. The information preservation and conveyance system of claim 23 also comprising an audio generation apparatus.

* * * * *